United States Patent
Tsuruya

(10) Patent No.: US 7,183,754 B2
(45) Date of Patent: Feb. 27, 2007

(54) DC/DC CONVERTER

(75) Inventor: Mamoru Tsuruya, Niiza (JP)

(73) Assignee: Sanken Electric Co., Ltd., Niiza (JP)

( * ) Notice: Subject to any disclaimer, the term of this patent is extended or adjusted under 35 U.S.C. 154(b) by 0 days.

(21) Appl. No.: 11/350,823

(22) Filed: Feb. 10, 2006

(65) Prior Publication Data
US 2006/0208713 A1 Sep. 21, 2006

(30) Foreign Application Priority Data
Mar. 16, 2005 (JP) ............................. 2005-075594

(51) Int. Cl.
G05F 1/40 (2006.01)
(52) U.S. Cl. ...................... 323/272; 323/222
(58) Field of Classification Search ................ 323/271, 323/272, 282, 222
See application file for complete search history.

(56) References Cited

U.S. PATENT DOCUMENTS

| | | | | |
|---|---|---|---|---|
| 4,748,397 A * | 5/1988 | Ogawa et al. | ............... | 323/222 |
| 6,034,514 A * | 3/2000 | Sakai | ........................ | 323/225 |
| 6,525,513 B1 * | 2/2003 | Zhao | ............................ | 323/272 |
| 7,116,087 B2 * | 10/2006 | Zhang et al. | ............... | 323/272 |
| 2006/0208713 A1 | 9/2006 | Tsuruya | | |

FOREIGN PATENT DOCUMENTS

JP 2002-10632 1/2002

OTHER PUBLICATIONS

U.S. Appl. No. 11/350,823, filed Feb. 10, 2006, Tsuruya.
U.S. Appl. No. 11/350,769, filed Feb. 10, 2006, Tsuruya.
U.S. Appl. No. 11/465,270, filed Aug. 17, 2006, Tsuruya.

* cited by examiner

*Primary Examiner*—Shawn Riley
(74) *Attorney, Agent, or Firm*—Oblon, Spivak, McClelland, Maier & Neustadt, P.C.

(57) ABSTRACT

A DC/DC converter according to the present invention includes a first switch connected to both ends of the DC power supply through a primary winding of a first transformer, a second switch connected to both ends of the DC power supply through a primary winding of a second transformer, a first series circuit connected between a node to which the primary winding of the first transformer and one end of the first switch are connected, and another end of the first switch, the first series circuit including a first diode, a smoothing capacitor, and an additional winding of the first transformer, which is connected to the primary winding of the first transformer in series, a second series circuit connected between a node to which the primary winding of the second transformer and one end of the second switch are connected, and another end of the second switch, the second series circuit including a second diode, the smoothing capacitor, and an additional winding of the second transformer, which is connected to the primary winding of the second transformer in series, a reactor connected to both ends of a series circuit in which a secondary winding of the first transformer and a secondary winding of the second transformer are connected in series, and a control circuit which turns on and off the first and second switches with a phase difference of half a cycle.

8 Claims, 6 Drawing Sheets

DC/DC CONVERTER

BACKGROUND OF THE INVENTION

1. Field of the Invention

The present invention relates to high-capacity, step-up DC/DC converters, and particularly to technologies for downsizing the same.

2. Description of the Related Art

FIG. 1 is a circuit configuration diagram of a conventional DC/DC converter. This DC/DC converter is described in JP2002-10632 A. The DC/DC converter shown in FIG. 1 is a step-up converter for large output current. In order to reduce the ripple current which flows through a smoothing capacitor C1, two converters are connected in parallel in the DC/DC converter, the converters operating with a 180° phase shift.

A switch Q1 comprised of a MOSFET or the like is connected to both ends of a DC power supply Vdc1 through a reactor L1. A switch Q2 comprised of a MOSFET or the like is connected to both ends of the DC power supply Vdc1 through a reactor L2. A series circuit including a diode D1 and the smoothing capacitor C1 is connected between a node to which the reactor L1 and the switch Q1 are connected, and a negative terminal of the DC power supply Vdc1. A series circuit including a diode D2 and the smoothing capacitor C1 is connected between a node to which the reactor L2 and the switch Q2 are connected, and the negative terminal of the DC power supply Vdc1. A load RL is connected to both ends of the smoothing capacitor C1.

The reactor L1, the diode D1, and the switch Q1 constitute a first converter. The reactor L2, the diode D2, and the switch Q2 constitute a second converter.

A control circuit 100 causes the high-frequency switching operation of the switches Q1 and Q2 with a 180° phase shift (half a cycle). The inductance value or the frequency are set so that the electric current flowing through the reactor L1 and the electric current flowing through the reactor L2 become zero every switching cycle.

Next, an operation of the conventional DC/DC converter thus configured will be described with reference to a timing chart of signals shown in FIG. 2.

At a time $t_{30}$, once the switch Q1 is turned on by a Q1 control signal Q1g from the control circuit 100, an electric current flows through a path from a positive side of the DC power supply Vdc1, to the reactor L1, to the switch Q1, and then to a negative side of the DC power supply Vdc1. Accordingly, an electric current Q1$i$ in the switch Q1 linearly increases. At the same time, an electric current L1$i$ in the reactor L1 also linearly increases.

At a time $t_{31}$, once the switch Q2 is turned off by a Q2 control signal Q2g from the control circuit 100, an electric current Q2$i$ in the switch Q2 rapidly becomes zero. At this time, the energy stored in the reactor L2 is supplied to the load RL via the diode D2 and the smoothing capacitor C1. An electric current L2$i$ in the reactor L2 also decreases from its peak value with a gradient corresponding to the difference value between the input voltage and the output voltage.

At a time $t_{32}$, once the switch Q2 is turned on by the Q2 control signal Q2g from the control circuit 100, the electric current Q2$i$ in the switch Q2 linearly increases. At the same time, the electric current L2$i$ in the reactor L2 also linearly increases.

At a time $t_{33}$, once the switch Q1 is turned off by the Q1 control signal Q1g from the control circuit 100, the electric current Q1$i$ in the switch Q1 rapidly becomes zero. At this time, the energy stored in the reactor L1 is supplied to the load RL via the diode D1 and the smoothing capacitor C1. The electric current L1$i$ in the reactor L1 also decreases from its peak value with a gradient corresponding to the difference value between the input voltage and the output voltage. The operation carried out at a time $t_{34}$ is similar to that carried out at the time $t_{30}$.

However, the DC/DC converter shown in FIG. 1 requires two reactors L1 and L2. In addition, if a perfect symmetry between the two converters inclusive of the circuit wiring cannot be maintained, the electric currents in these converters cannot be balanced, and the uneven loss will be caused. Moreover, a correction circuit or the like which carries out correction so that the electric currents in the converters are balanced, becomes necessary, which has resulted in a disadvantage that the circuit becomes complicated.

Furthermore, if the step-up ratio of the DC/DC converter is high, since conduction angles of the switching elements become large, conduction angles of the diodes D1 and D2 become small. Thus, peak current becomes high, and the ripple current which flows through the smoothing capacitor C1 therefore increases. As a result, the smoothing capacitor C1 has to be large.

SUMMARY OF THE INVENTION

An object of the present invention is to provide a step-up DC/DC converter with which the ripple current which flows through a smoothing capacitor can be reduced, and the circuit can be simplified, and which DC/DC converter can thus be downsized.

A first mode of the present invention is a DC/DC converter for boosting a voltage of a DC power supply, the DC/DC converter comprises a first switch connected to both ends of the DC power supply through a primary winding of a first transformer, a second switch connected to both ends of the DC power supply through a primary winding of a second transformer, a first series circuit connected between a node to which the primary winding of the first transformer and one end of the first switch are connected, and another end of the first switch, the first series circuit including a first diode, a smoothing capacitor, and an additional winding of the first transformer, which is connected to the primary winding of the first transformer in series, a second series circuit connected between a node to which the primary winding of the second transformer and one end of the second switch are connected, and another end of the second switch, the second series circuit including a second diode, the smoothing capacitor, and an additional winding of the second transformer, which is connected to the primary winding of the second transformer in series, a reactor connected to both ends of a series circuit in which a secondary winding of the first transformer and a secondary winding of the second transformer are connected in series, and a control circuit which turns on and off the first and second switches with a phase difference of half a cycle.

A second mode of the present invention is a DC/DC converter for boosting a voltage of a DC power supply, the DC/DC converter comprises a first switch connected to both ends of the DC power supply through a primary winding of a first transformer, a second switch connected to both ends of the DC power supply through a primary winding of a second transformer, a first series circuit connected between a node to which the primary winding of the first transformer and one end of the first switch are connected, and another end of the first switch, the first series circuit including a third switch, a smoothing capacitor, and an additional winding of the first transformer, which is connected to the primary winding of the first transformer in series, a second series circuit connected between a node to which the primary winding of the second transformer and one end of the second switch are connected, and another end of the second switch, the second series circuit including a fourth switch, the smoothing capacitor, and an additional winding of the second transformer, which is connected to the primary winding of the second transformer in series, a reactor connected to both ends of a series circuit in which a secondary winding of the first transformer and a secondary winding of the second transformer are connected in series, and a control circuit which turns on and off the first and second switches with a phase difference of half a cycle, turns on and off the third and first switches complementarily, and turns on and off the fourth and second switches complementarily.

In the first and second modes of the present invention, once the first switch is turned on, an electric current flows through the primary winding of the first transformer. A voltage is then generated across the secondary winding of the first transformer, and energy is stored in the reactor. The energy stored in the reactor causes a voltage to be generated across the primary and additional windings of the second transformer via the secondary winding of the second transformer, and is thus returned to the smoothing capacitor via the second diode (or the fourth switch in the second mode of the present invention).

On the other hand, once the second switch is turned on, an electric current flows through the primary winding of the second transformer. A voltage is then generated across the secondary winding of the second transformer, and energy is stored in the reactor. The energy stored in the reactor causes a voltage to be generated across the primary and additional windings of the first transformer via the secondary winding of the first transformer, and is thus returned to the smoothing capacitor via the first diode (or the third switch in the second mode of the present invention). In other words, the frequency at the reactor as an energy storage element is doubled, so that the reactor can be downsized. In addition, the current balance between the two converters can be achieved.

Additionally, an additional winding ratio A defined as A=(np+np1)/np is adjusted depending on a ripple current which flows through the smoothing capacitor, where a number of turns of the primary winding and a number of turns of the additional winding of each of the first and second transformers are np and np1, respectively.

With the present invention, by adjusting the additional winding ratio of the transformer, the duty factor of each of the switches can be reduced, and the ripple current which flows through the smoothing capacitor can therefore be reduced. In addition, it is possible to downsize the smoothing capacitor, to reduce the loss, and to achieve high efficiency.

Additionally, the DC/DC converter according to the present invention further comprises a core in which a closed magnetic circuit is formed, the core having first, second and third legs, wherein the primary and additional windings of the first transformer are wound around the first leg of the core; the primary and additional windings of the second transformer are wound around the second leg of the core, and a gap is formed in the third leg of the core.

With the present invention, by using the core having three legs, the first and second transformers and the reactor are integrated, so that the circuit can be simplified, and the DC/DC converter can be further downsized and improved in efficiency.

Additionally, the DC/DC converter according to the present invention further comprises a core in which a closed magnetic circuit is formed, the core having a plurality of legs, wherein first and second coils are wound around one of the plurality of legs of the core, the first coil including the primary and additional windings of the first transformer, and the second coil including the primary and additional windings of the second transformer, and a magnetic shunt is provided between the first and second coils.

With the present invention, the coupling between the first and second coils is excellent, and almost all of the magnetic flux generated by these coils passes through the magnetic shunt. For this reason, the inductance can be adjusted over a wide range by changing the gap of the magnetic shunt. Accordingly, for an application in which a large peak current flows, the DC/DC converter can be used without core saturation by setting the gap large.

DESCRIPTION OF THE PREFERRED EMBODIMENT

Detailed description will be given below of several embodiments of DC/DC converters according to the present invention with reference to the drawings.

The DC/DC converter of each of the embodiments is characterized in that, by the use of two transformers, outputs from two converters are combined to double the frequency thereof and applied to a reactor, so that the reactor as an energy storage element is downsized, and the current balance between the converters is achieved.

In addition, in the DC/DC converter, an additional winding of a primary winding of the transformer is provided to allow the transformers to operate as autotransformers. In the case of a converter with a high step-up ratio, duty factors of switch elements (switches) are reduced, and the ripple current which flows through a smoothing capacitor is thus reduced, so that the smoothing capacitor can be downsized, and the downsizing of the converter can therefore be achieved.

Moreover, the DC/DC converter is characterized in that a magnetic circuit is devised to integrate the transformers and the reactor, and further downsizing of the circuit is thus achieved.

(First Embodiment)

Figure 3:
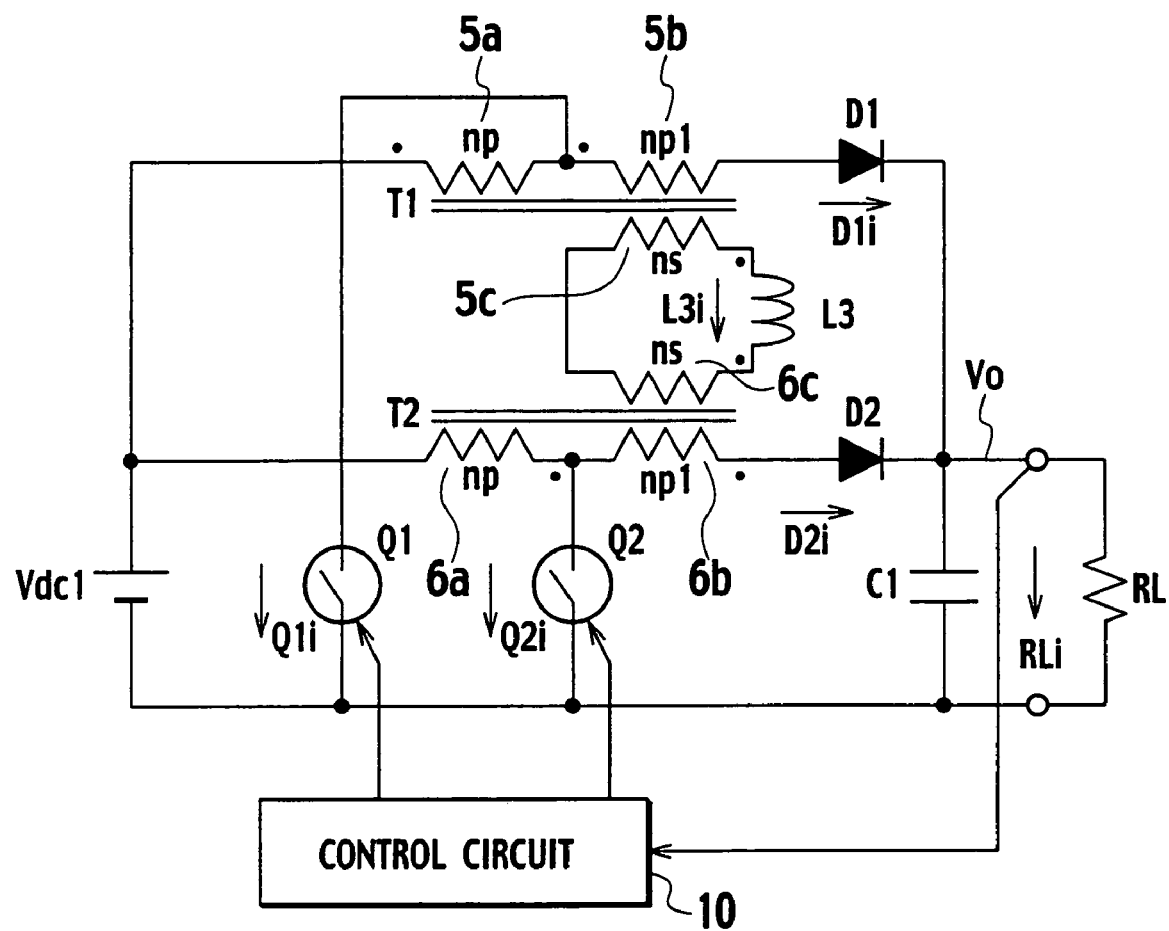
FIG. 3 is a circuit configuration diagram of a DC/DC converter of a first embodiment.

FIG. 3 is a circuit configuration diagram of a DC/DC converter of a first embodiment. The DC/DC converter shown in FIG. 3 is a converter for boosting the voltage of a DC power supply. The DC/DC converter includes the DC power supply Vdc1, a transformer T1 (corresponding to the first transformer of the present invention), a transformer T2 (corresponding to the second transformer of the present invention), a reactor L3 (corresponding to the reactor of the present invention), a switch Q1 (corresponding to the first switch of the present invention), a switch Q2 (corresponding to the second switch of the present invention), a diode D1 (corresponding to the first diode of the present invention), a diode D2 (corresponding to the second diode of the present invention), a smoothing capacitor C1, and a control circuit 10.

The transformer T1 has a primary winding 5a (np turns), an additional winding 5b (np1 turns) connected to the primary winding 5a in series, and a secondary winding (ns turns) electromagnetically coupled to the primary winding 5a and the additional winding 5b. The transformer T2 is constructed in the same way as the transformer T1i having a primary winding 6a (np turns), an additional winding 6b (np1 turns) connected to the primary winding 6a in series, and a secondary winding 6c (ns turns) electromagnetically coupled to the primary winding 6a and the additional winding 6b.

The drain-source of the switch Q1 comprised of a MOSFET or the like is connected to both ends of the DC power supply Vdc1 through the primary winding 5a of the transformer T1. The drain-source of the switch Q2 comprised of a MOSFET or the like is connected to both ends of the DC power supply Vdc1 through the primary winding 6a of the transformer T2.

A first series circuit, which includes the additional winding 5b of the transformer T1, which winding is connected in series to the primary winding 5a of the transformer T1, the diode D1, and the smoothing capacitor C1, is connected between a node to which the primary winding 5a of the transformer T1 and the drain (corresponding to "one end" of the present invention) of the switch Q1 are connected, and the source (corresponding to "another end" of the present invention) of the switch Q1.

A second series circuit, which includes the additional winding 6b of the transformer T2, which winding is connected in series to the primary winding 6a of the transformer T2, the diode D2, and the smoothing capacitor C1, is connected between a node to which the primary winding 6a of the transformer T2 and the drain (corresponding to "one end" of the present invention) of the switch Q2 are connected, and the source (corresponding to "another end" of the present invention) of the switch Q2.

The reactor L3 is connected to both ends of a series circuit in which the secondary winding 5c of the transformer T1 and the secondary winding 6c of the transformer T2 are connected in series. The control circuit 10 turns on and off the switches Q1 and Q2 depending on the output voltage Vo of the smoothing capacitor C1 with a phase difference of 180°.

The transformer T1, the diode D1, and the switch Q1 constitute a first converter. The transformer T2, the diode D2, and the switch Q2 constitute a second converter.

Description will now be given of an operation of the DC/DC converter of the first embodiment thus configured with reference to a timing chart shown in FIG. 4.

First of all, at a time $t_0$, the switch Q1 is turned on by a Q1 control signal Q1g from the control circuit 10. Then, an electric current flows through a path from a positive side of the DC power supply Vdc1, to the primary winding 5a, to the switch Q1, and then to a negative side of the DC power supply Vdc1. Accordingly, an electric current Q1i in the switch Q1 linearly increases. At the same time, a voltage is generated also across the secondary winding 5c of the transformer T1, and an electric current L3i flows through the reactor L3 via a path from the secondary winding 5c, to the reactor L3, to the secondary winding 6c, and then to the secondary winding 5c.

This electric current L3i flows in accordance with the law of equal ampere-turns of transformers, causing energy to be stored in the reactor L3. At the same time, the same electric current flows through the secondary winding 6c of the transformer T2. Accordingly, across the primary winding 6a of the transformer T2 and across the additional winding 6b thereof, voltages corresponding to the respective numbers of turns are induced.

When an additional winding ratio of the transformer T2 is A=(np+np1)/np, an electric current of 1/A of the electric current Q1i in the switch Q1 flows through the diode D2 via a path from the positive side of the DC power supply Vdc1, to the primary winding 6a, to the additional winding 6b, to the diode D2, to the smoothing capacitor C1, and then to the negative side of the DC power supply Vdc1. The electric current D2i in the diode D2 flows until a time $t_2$ at which the switch Q2 is turned on. The output voltage Vo across the smoothing capacitor C1 is the sum of a voltage across the DC power supply Vdc1 (an input voltage), a voltage generated across the primary winding 6a of the transformer T2, and a voltage generated across the additional winding 6b of the transformer T2.

When a duty factor of the switch Q1 is D (D=Ton/T), the voltage generated across the transformer T2 is A·Vdc1·D, where Ton is a period of time during which the switch Q1 is conducting, and T is a cycle in which the switch Q1 is switched. The output voltage Vo across the smoothing capacitor C1 is Vo=Vdc1(1+A·D) in this case. Accordingly, the output voltage Vo can be controlled by changing the duty factor D.

At a time $t_1$, the switch Q1 is turned off by the Q1 control signal Q1g from the control circuit 10. Then, an electric current D1i flows through a path from the positive side of the DC power supply Vdc1, to the primary winding 5a, to the additional winding 5b, to the diode D1, to the smoothing capacitor C1, and then to the negative side of the DC power supply Vdc1. The electric current D1i in the diode D1 flows from the time $t_1$ to a time $t_4$.

At a time $t_2$, the switch Q2 is turned on by a Q2 control signal Q2g from the control circuit 10. Then, an electric current flows through a path from the positive side of the DC power supply Vdc1, to the primary winding 6a, to the switch Q2, and then to the negative side of the DC power supply Vdc1. Accordingly, an electric current Q2i in the switch Q2 linearly increases. At the same time, a voltage is generated also across the secondary winding 6c of the transformer T2, and an electric current L3i flows through the reactor L3 via a path from the secondary winding 6c, to the secondary winding 5c, to the reactor L3, and then to the secondary winding 6c while increasing.

This electric current L3i flows in accordance with the law of equal ampere-turns of transformers, causing energy to be stored in the reactor L3. At the same time, the same electric current flows through the secondary winding 5c of the transformer T1. Accordingly, across the primary winding 5a of the transformer T1 and across the additional winding 5b thereof, voltages corresponding to the respective numbers of turns are induced.

When an additional winding ratio of the transformer T1 is A=(np+np1)/np, an electric current of 1/A of the electric current Q2i in the switch Q2 flows through the diode D1 via a path from the positive side of the DC power supply Vdc1, to the primary winding 5a, to the additional winding 5b, to the diode D1, to the smoothing capacitor C1, and then to the negative side of the DC power supply Vdc1. The electric current D1i in the diode D1 flows until the time $t_4$ at which the switch Q1 is turned on. The output voltage Vo across the smoothing capacitor C1 is the sum of a voltage across the DC power supply Vdc1 (the input voltage), a voltage generated across the primary winding 5a of the transformer T1, and a voltage generated across the additional winding 5b of the transformer T1. The operation carried out at the time $t_4$ is similar to that carried out at the time $t_0$.

In the case where each of the duty factors D of the switches Q1 and Q2 is 0.5 or less, the period of time during which the electric current D2i in the diode D2 flows is equal to or more than ½ of the cycle.

Since the switches Q1 and Q2 are activated with a 180° phase shift, an electric current C1i which flows through the smoothing capacitor C1 consecutively flows in. Accordingly, it is made possible to significantly reduce the ripple current which flows through the smoothing capacitor C1. An appropriate duty factor D can be set using the additional winding ratio A of the transformer T1, and the additional winding ratio A of the transformer T2. It is preferable that the additional winding ratio A be equal to or more than 1.

In other words, by adjusting the additional winding ratio A of the transformer T1 and the additional winding ratio A of the transformer T2, the duty factor D can be adjusted. In addition, by reducing the duty factors of the switches Q1 and Q2, the ripple current which flows through the smoothing capacitor C1 can be reduced. In this way, it is possible to downsize the smoothing capacitor C1, to reduce the loss, and to achieve a high efficiency.

Figure 1:
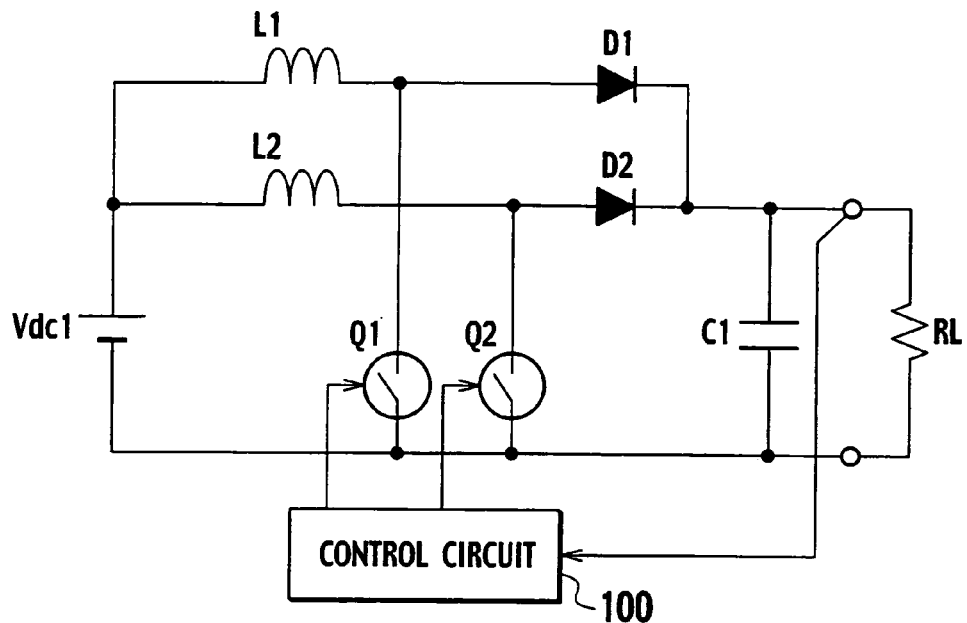
FIG. 1 is a circuit configuration diagram of a conventional DC/DC converter.
Figure 2:
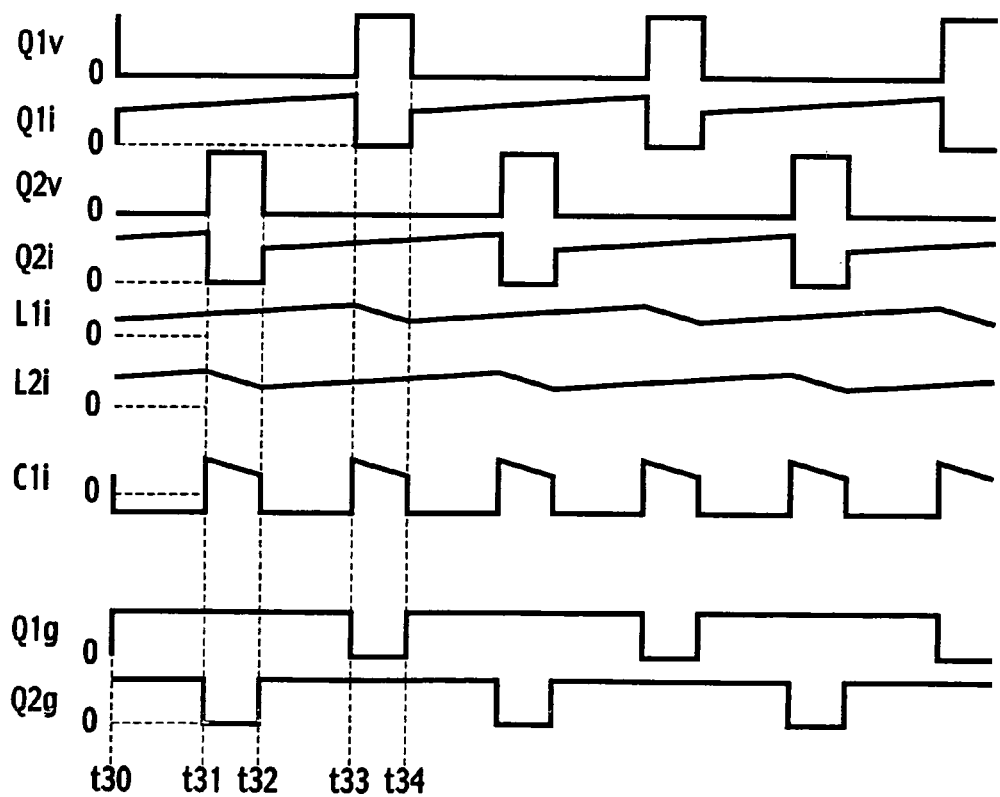
FIG. 2 is a timing chart of signals at respective parts of the conventional DC/DC converter.

In addition, since the switches Q1 and Q2 are activated with a 180° phase shift, the reactor L3 is excited alternately. Accordingly, the reactor L3 operates at a frequency which is two times higher than that given when the two reactors L1 and L2 are used as shown in FIG. 1. For this reason, the inductance of the reactor L3 can be reduced. In addition, the electric current which flows through the reactor L3 is substantially equal to the electric current in the switch Q1, and the two reactors L1 and L2 can be replaced with the downsized single reactor L3.

The electric currents which flow through the switches Q1 and Q2 are determined by the electric current in the reactors L3. Since the same transformers are used for the transformers T1 and T2, the electric currents which flow through the switches Q1 and Q2 are equal, and forcibly balanced. In addition, since the transformers T1 and T2 store no energy, these may be small transformers, so that the converter can be downsized as a whole.

(Second Embodiment)

Figure 5:
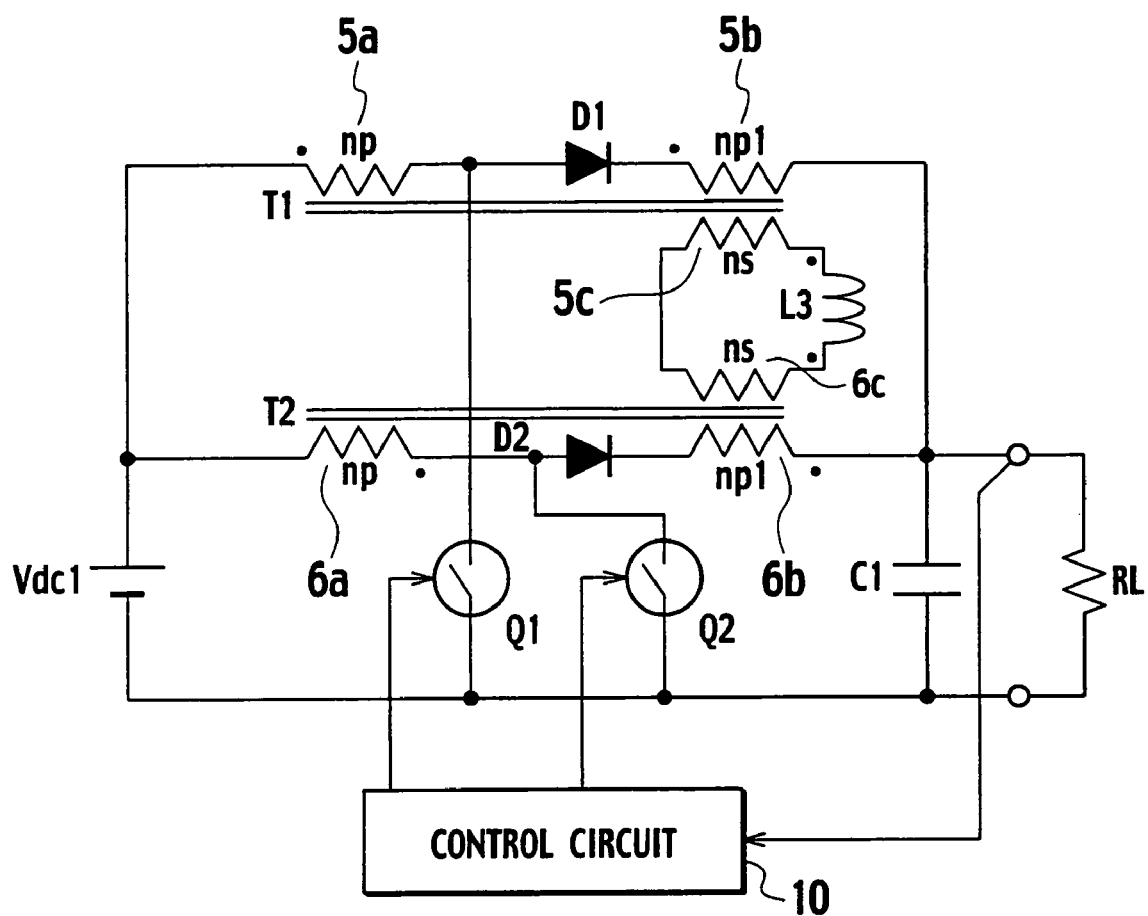
FIG. 5 is a circuit configuration diagram of a DC/DC converter of a second embodiment.

FIG. 5 is a circuit configuration diagram of a DC/DC converter of a second embodiment. The DC/DC converter shown in FIG. 5 is different from the DC/DC converter shown in FIG. 3 in the following point. That is, the diode D1 is connected between the primary winding 5a and the additional winding 5b of the transformer T1, and the diode D2 is connected between the primary winding 6a and the additional winding 6b of the transformer T2.

Since an operation of the DC/DC converter of the second embodiment thus configured is similar to that of the DC/DC converter shown in FIG. 3, similar effects can be obtained.

In addition, since the switch Q1 and the diode D1 are provided closely, and the switch Q2 and the diode D2 are provided closely, the switches Q1 and Q2 can be integrated with the diodes D1 and D2, respectively. Accordingly, the circuit can be modularized or integrated into an IC.

(Third Embodiment)

Figure 6:
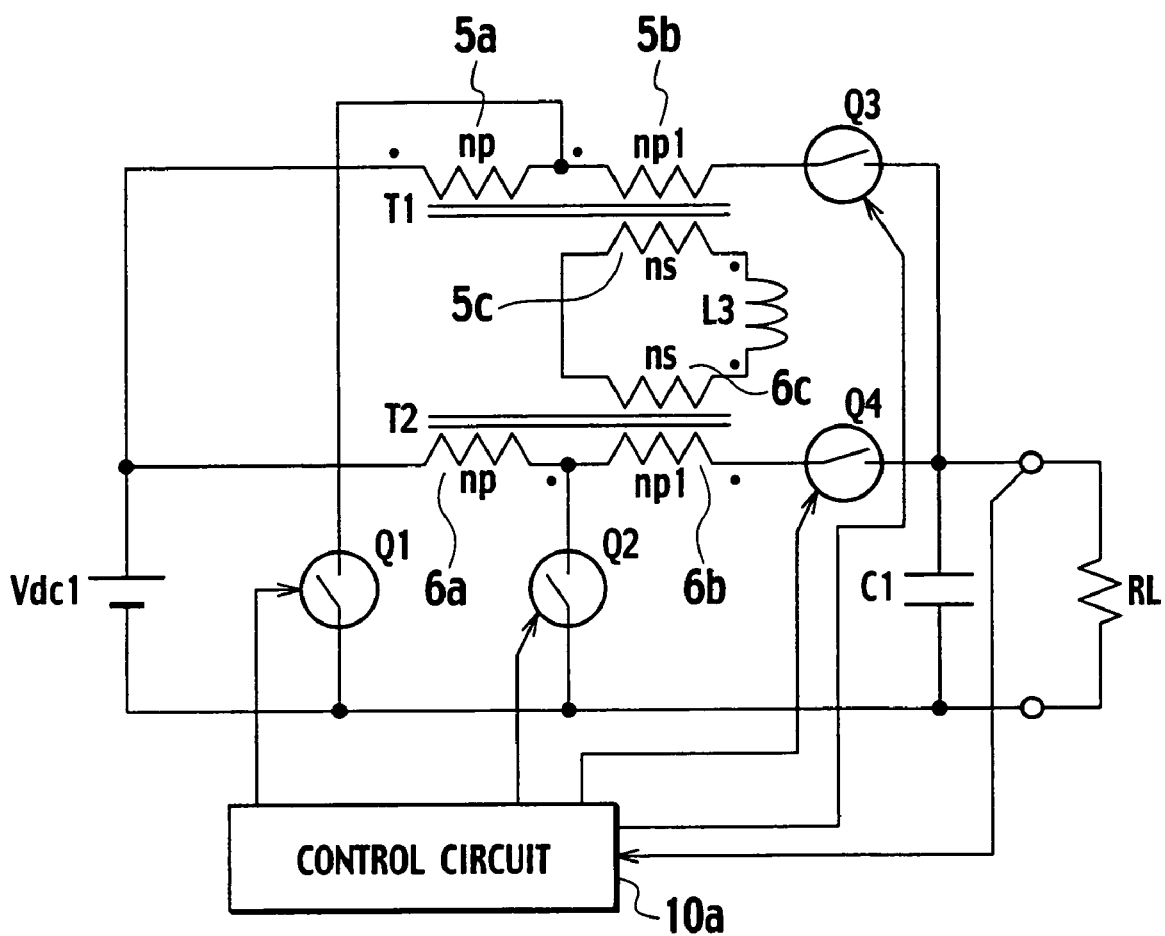
FIG. 6 is a circuit configuration diagram of a DC/DC converter of a third embodiment.

FIG. 6 is a circuit configuration diagram of a DC/DC converter of a third embodiment. The DC/DC converter shown in FIG. 6 is characterized in that, in the DC/DC converter shown in FIG. 3, the diode D1 is replaced with a switch Q3 (corresponding to the third switch of the present invention) comprised of a MOSFET or the like, and the diode D2 is replaced with a switch Q4 (corresponding to the fourth switch of the present invention) comprised of a MOSFET or the like.

A control circuit 10a turns on and off the switches Q1 and Q2 with a phase difference of 180°, turns on and off the switches Q3 and Q1 complementarily, and turns on and off the switches Q4 and Q2 complementarily.

Figure 4:
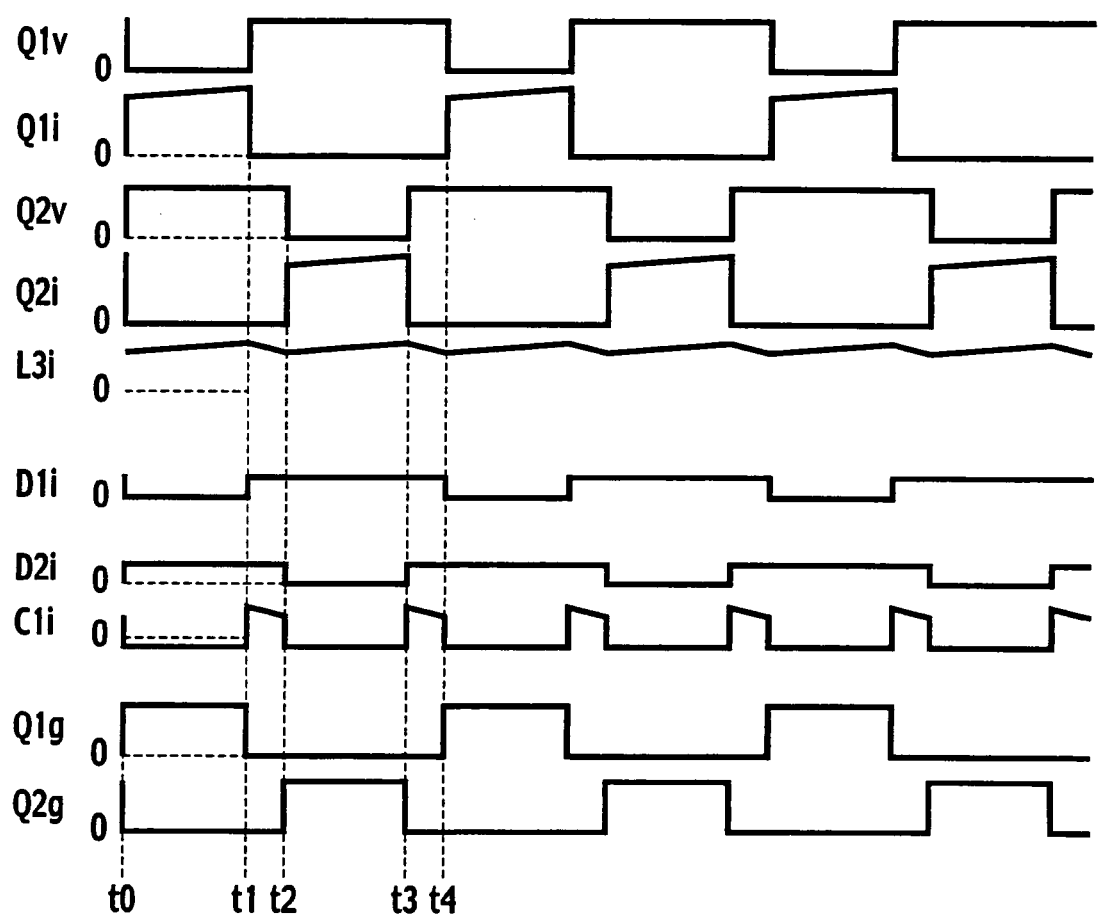
FIG. 4 is a timing chart of signals at respective parts of the DC/DC converter of the first embodiment.

Since an operation of the DC/DC converter of the third embodiment is similar to that carried out in accordance with the timing chart shown in FIG. 4, detailed description of the operation will be omitted. The timing chart of the third embodiment can be obtained by replacing the electric current D1i in the diode D1 with an electric current Q3i in the switch Q3, and replacing the electric current D2i in the diode D2 with an electric current Q4i in the switch Q4, in the timing chart shown in FIG. 4. The description of the operation of the third embodiment can be provided by replacing the diode D1 with the switch Q3, and replacing the diode D2 with the switch Q4, in the description of the operation of the first embodiment.

With the DC/DC converter of the third embodiment, it is made possible to reduce the loss in the diodes in the case of a large current.

(Embodiments of Magnetic Circuit with Which Transformers and Reactor are Integrated)

FIGS. 7A to 7E are diagrams showing magnetic circuits with each of which the transformers and the reactor included in any one of the DC/DC converters of the first to third embodiments are integrated. FIGS. 7A to 7E show styles of integrating the transformers and the reactor.

Figure 7A:
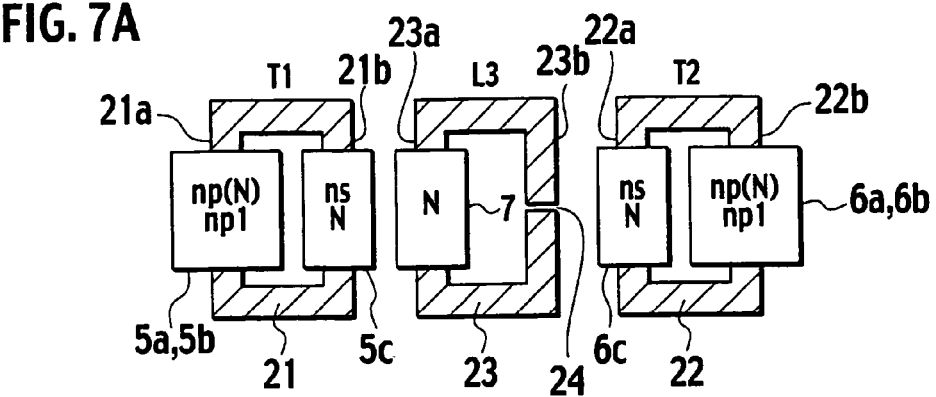
FIG. 7A is a diagram showing transformers T1 and T2, and a reactor L3.

As shown in FIG. 7A, the transformer T1 used in any one of the DC/DC converters of the first to third embodiments has the primary winding 5a and the additional winding 5b which are wound around a first leg 21a of a core 21 made of magnetic material, and has the secondary winding 5c wound around a second leg 21b of the core 21 in which a closed magnetic circuit is formed. The transformer T2 has the primary winding 6a and the additional winding 6b which are wound around a first leg 22b of a core 22, and has the secondary winding 6c wound around a second leg 22a of the core 22 in which a closed magnetic circuit is formed. The reactor L3 has a winding 7 wound around a first leg 23a of a core 23 which has a gap. The gap 24 is formed in a second leg 23b of the core 23.

Figure 7B:
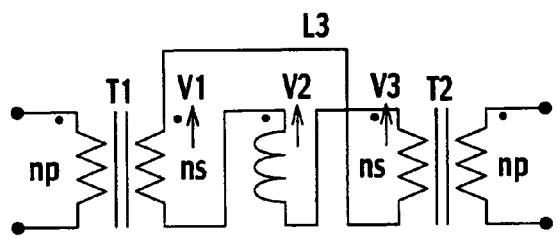
FIG. 7B is a diagram showing an electric connection between the transformer T1, the transformer T2, and the reactor L3.

The transformer T1, the transformer T2, and the reactor L3 are connected as shown in FIG. 7B. Accordingly, there is no change in the operation even if a core shown in FIG.

7C is used, into which the cores of the transformer T1, the transformer T2, and the reactor L3 shown in FIG. 7A are integrated.

Figure 7C:
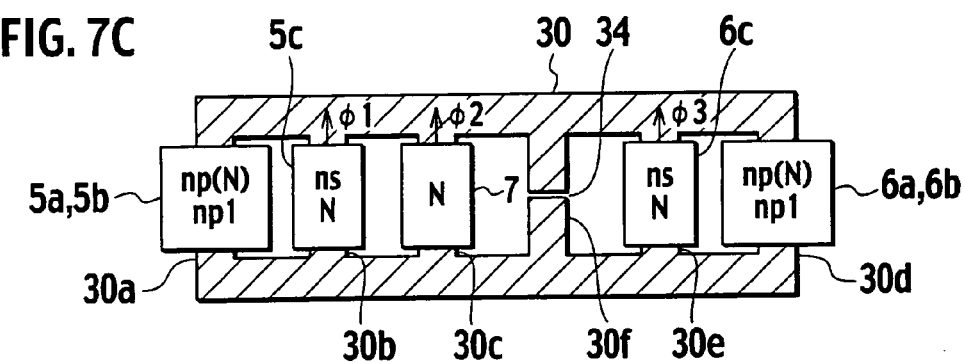
FIG. 7C is a diagram showing a magnetic circuit with which the transformers T1 and T2, and the reactor L3 are integrated.

With regard to a magnetic circuit shown in FIG. 7C, the primary winding 5a and the additional winding 5b of the transformer T1 are wound around a first leg 30a of a core 30, and the secondary winding 5c of the transformer T1 is wound around a second leg 30b of the core 30 in which a closed magnetic circuit is formed. A winding 7 is wound around a third leg 30c. The primary winding 6a and the additional winding 6b of the transformer T2 are wound around a fourth leg 30d. The secondary winding 6c of the transformer T2 is wound around a fifth leg 30e. A gap 34 is formed in a sixth leg 30f. A magnetic flux penetrating the secondary winding 5c of the transformer T1 is $\Phi 1$; a magnetic flux penetrating the winding 7 of the reactor L3 is $\Phi 2$; and a magnetic flux penetrating the secondary winding 6c of the transformer T2 is $\Phi 3$.

The secondary winding 5c (ns turns) of the transformer T1, the secondary winding 6c (ns turns) of the transformer T2, and the reactor L3 are connected in a loop (a closed loop). For this reason, when a voltage across the secondary winding 5c of the transformer T1, a voltage across the winding 7 of the reactor L3, and a voltage across the secondary winding 6c of the transformer T2 are V1, V2, and V3, respectively, the total voltage generated across the windings 5c, 6c and 7 is V1+V2+V3=0.

When the numbers of turns of the windings 5c, 6c and 7 are equal to one another, and are equal to N, since the magnetic flux $\Phi$ through the core around which the windings are wound satisfies $d\Phi/dt=V$, and the sum of the voltages across the windings is equal to zero, the total change in the magnetic flux through the core is also zero. Accordingly, even if the magnetic circuit shown in FIG. 7A is replaced with the magnetic circuit shown in FIG. 7C, since the total magnetic flux is $\Phi 1+\Phi 2+\Phi 3=0$, there is no influence on the operation.

Figure 7D:
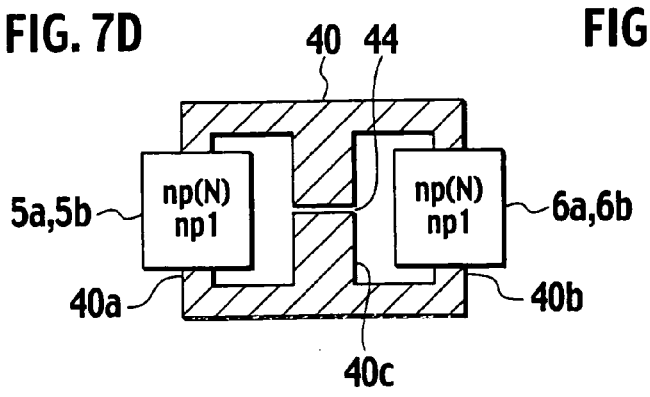
FIG. 7D is a diagram showing a magnetic circuit equivalent to the magnetic circuit shown in FIG. 7C.

Moreover, since $\Phi 1+\Phi 2+\Phi 3=0$, there is no influence on the operation even if a magnetic circuit, in which the legs 30b, 30c and 30e through which the magnetic fluxes $\Phi 1$, $\Phi 2$ and $\Phi 3$ pass are removed, shown in FIG. 7D is used. With regard to the magnetic circuit shown in FIG. 7D, the primary winding 5a and the additional winding 5b of the transformer T1 are wound around a first leg 40a of a core 40 in which a closed magnetic circuit is formed, the primary winding 6a and the additional winding 6b of the transformer T2 are wound around a second leg 40b, and a gap 44 is formed in a third leg 40c. In other words, the magnetic circuit can be downsized.

By using the core comprised of the three legs in this way, it is made possible to simplify the two transformers and the reactor to simplify the circuit configuration.

Figure 7E:
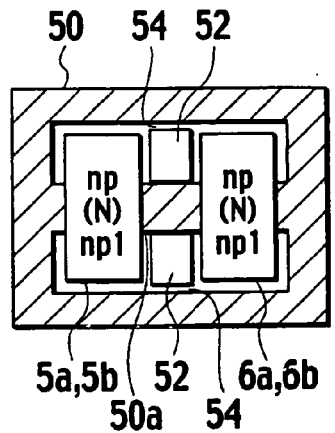
FIG. 7E is a diagram showing a magnetic circuit having a magnetic shunt, with which magnetic circuit the transformers T1 and T2, and the reactor L3 are integrated.

In another form, as shown in FIG. 7E, a first coil including the primary winding 5a and the additional winding 5b of the transformer T1, as well as a second coil including the primary winding 6a and the additional winding 6b of the transformer T2 are wound around a center leg 50a of a core 50 in which a closed magnetic circuit is formed. Between the two coils, a magnetic shunt 52 made of magnetic material is provided. Gaps 54 are formed between the magnetic shunt 52 and outer legs of the core 50.

With regard to the magnetic circuit as shown in FIG. 7E, the coupling between the first and second coils is excellent. Since almost all of the magnetic flux generated by these coils passes through the magnetic shunt 52, the inductance can be adjusted over a wide range by changing the gaps 54 between the magnetic shunt 52 and the legs. Accordingly, for an application in which a large peak current flows, the DC/DC converter can be used without core saturation by setting the gap 54 large.

The present invention is not limited to the DC/DC converters of the first to third embodiments. With regard to the configuration of the second embodiment shown in FIG. 5, for example, the diodes D1 and D2 shown in FIG. 5 may be replaced with the switches Q3 and Q4 shown in FIG. 6, respectively, and the control circuit 10a shown in FIG. 6 may control the switches Q3 and Q4. Accordingly, the effects of the second embodiment as well as the effects of the third embodiment can be obtained.

The present invention is applicable to power circuits for switching power supplies, such as DC/DC converters and AC/DC converters.

What is claimed is:

1. A DC/DC converter for boosting a voltage of a DC power supply, comprising:
    a first switch connected to both ends of the DC power supply through a primary winding of a first transformer;
    a second switch connected to both ends of DC power supply through a primary winding of a second transformer;
    a first series circuit connected between a node to which the primary winding of the first transformer and one end of the first switch are connected, and another end of the first switch, the first series circuit including: an additional winding of the first transformer, which is connected to the primary winding of the first transformer in series; a first diode; and a smoothing capacitor;
    a second series circuit connected between a node to which the primary winding of the second transformer and one end of the second switch are connected, and another end of the second switch, the second series circuit including: an additional winding of the second transformer, which is connected to the primary winding of the second transformer in series; a second diode; and the smoothing capacitor;
    a reactor connected to both ends of a series circuit in which a secondary winding of the first transformer and a secondary winding of the second transformer are connected in series; and
    a control circuit which turns on and off the first and second switches with a phase difference of half a cycle.

2. The DC/DC converter according to claim 1,
    wherein an additional winding ratio A defined as A=(np+np1)/np is adjusted depending on a ripple current which flows through the smoothing capacitor, where a number of turns of the primary winding and a number of turns of the additional winding of each of the first and second transformers are np and np1, respectively.

3. The DC/DC converter according to claim 1, further comprising:
    a core in which a closed magnetic circuit is formed, the core having first, second and third legs,
    wherein the primary and additional windings of the first transformer are wound around the first leg of the core; the primary and additional windings of the second transformer are wound around the second leg of the core; and a gap is formed in the third leg of the core.

4. The DC/DC converter according to claim 1, further comprising:
    a core in which a closed magnetic circuit is formed, the core having a plurality of legs, wherein first and second coils are wound around one of the plurality of legs of the core, the first coil including the primary and additional windings of the first transformer, and the second coil including the primary and additional windings of the second transformer; and a magnetic shunt is provided between the first and second coils.

5. A DC/DC converter for boosting a voltage of a DC power supply, comprising:

a first switch connected to both ends of the DC power supply through a primary winding of a first transformer;

a second switch connected to both ends of the DC power supply through a primary winding of a second transformer;

a first series circuit connected between a node to which the primary winding of the first transformer and one end of the first switch are connected, and another end of the first switch, the first series circuit including: an additional winding of the first transformer, which is connected to the primary winding of the first transformer in series; a third switch; and a smoothing capacitor;

a second series circuit connected between a node to which the primary winding of the second transformer and one end of the second switch are connected, and another end of the second switch, the second series circuit including: an additional winding of the second transformer, which is connected to the primary winding of the second transformer in series; a fourth switch; and the smoothing capacitor;

a reactor connected to both ends of a series circuit in which a secondary winding of the first transformer and a secondary winding of the second transformer are connected in series; and a control circuit which turns on and off the first and second switches with a phase difference of half a cycle, turns on and off the third and first switches complementarily, and turns on and off the fourth and second switches complementarily.

6. The DC/DC converter according to claim 5, wherein an additional winding ratio A defined as $A=(np+np1)/np$ is adjusted depending on a ripple current which flows through the smoothing capacitor, where a number of turns of the primary winding and a number of turns of the additional winding of each of the first and second transformers are np and np1, respectively.

7. The DC/DC converter according to claim 5, further comprising:

a core in which a closed magnetic circuit is formed, the core having first, second and third legs, wherein the primary and additional windings of the first transformer are wound around the first leg of the core; the primary and additional windings of the second transformer are wound around the second leg of the core; and a gap is formed in the third leg of the core.

8. The DC/DC converter according to claim 5, further comprising:

a core in which a closed magnetic circuit is formed, the core having a plurality of legs, wherein first and second coils are wound around one of the plurality of legs of the core, the first coil including the primary and additional windings of the first transformer, and the second coil including the primary and additional windings of the second transformer; and a magnetic shunt is provided between the first and second coils.

* * * * *